United States Patent Office 3,320,091
Patented May 16, 1967

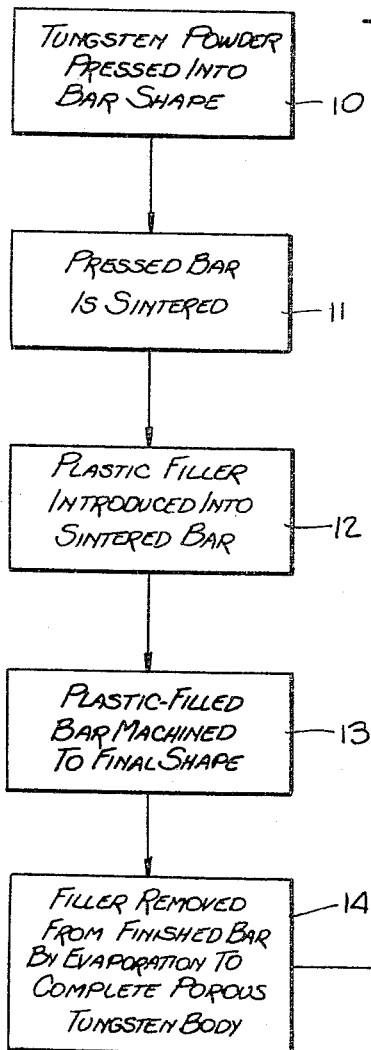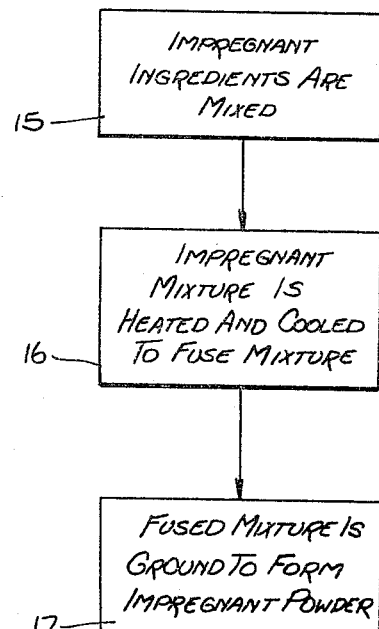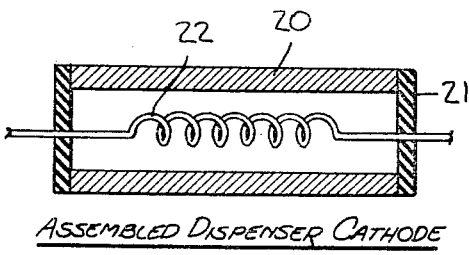
Fig. 1.
Fig. 2.
INVENTOR.
Otto G. Koppius

3,320,091
METHOD FOR IMPREGNATING TUNGSTEN DISPENSER CATHODES
Otto G. Koppius, Lexington, Ky., assignor to Semicon Associates, Inc., Lexington, Ky., a corporation of Kentucky
Filed Sept. 24, 1963, Ser. No. 311,174
6 Claims. (Cl. 117—223)

The present invention relates generally to tungsten dispenser cathode structures, and more particularly to improved methods for fabricating such structures. This application is a continuation-in-part of my co-pending application, Ser. No. 858,799, filed Dec. 10, 1959 and now U.S. Patent 3,118,080.

Dispenser cathodes are known in which a porous tungsten body is impregnated with a supply of an alkaline earth composition capable of furnishing free alkaline earth metal to the cathode surface. In the U.S. Patents 2,700,000 and 2,813,807 there are disclosed dispenser cathodes in which a preformed porous body of refractory metal is impregnated from a melt with a fused mixture of barium oxide and one or more other metal oxides. During operation of the cathode, the mixture reacts with the tungsten to supply free barium to an emissive surface of the cathode.

Direct impregnation of porous tungsten with barium oxide alone is not satisfactory in that barium oxide has a very high melting point (1923° C.) and at that temperature it has such a high evaporation rate in vacuum that it is very difficult to impregnate the porous body from the melt. Moreover, since barium oxide tends to react rapidly with tungsten during impregnation, an inoperative or dead cathode may result, for little barium oxide remains to react with the refractory metal during cathode operation.

In order, therefore, effectively to introduce barium oxide into the pores of the tungsten body, it has heretofore been the practice to make use of a foreign element or carrier, such as an oxide selected from the group consisting of aluminum oxide, silicon dioxide, boric oxide, beryllium oxide, neodymium oxide, lanthanum oxide and praseodymium oxide. Such carrier compounds act as a diluent and fill up the pores of the tungsten. The carrier has the effect of increasing the apparent density of the porous tungsten and thus a lower barium evaporation is obtained.

Diluting agents act to reduce the melting temperature of the alkaline earth oxide mixture. For example, a standard mixture, such as one having a 4–BaO, 1–CaO, 1–$Al_2O_3$ mol ratio, melts at around 1600° C., whereas each of the components in this mixture melts above 1900° C. This reduction in temperature causes less corrosion of the porous tungsten during impregnation. Moreover, evaporation of emissive material during impregnation is cut down by reason of the lower melting temperature. However, the introduction of the diluent tends to fill the pores of the tungsten body and results in an inferior cathode.

In my above-identified co-pending application, there is disclosed a dispenser cathode having a porous tungsten body which is impregnated with a fused mixture of an alkaline earth metal oxide and a tungstate of an alkaline earth metal. A significant advantage of this method is that no new compounds or agents are introduced into the porous tungsten except those which normally would be present as final end products of the reaction of alkaline metal oxides with tungsten. Thus, by introducing into a porous tungsten body the fused mixture of impregnants free of foreign carriers, the resultant structure has an emission level which is far greater than that achieved with prior-art structures. Moreover, the barium evaporation rate can be better controlled if no carrier compounds are used to introduce the barium oxide into the porous tungsten.

While the method described in the above-identified co-pending application has produced superior dispenser-type cathodes, it has been found that the emissive life thereof in some instances is erratic due to improper impregnation.

Specifically, it was found that otherwise identical samples of porous tungsten did not pick up identical amounts of impregnant, nor in all cases a full amount of impregnant. In an attempt to remedy this defect, the impregnation temperature was increased to about 1850° C. in order to make the molten oxide mixture more fluid and thereby increase the possibility of impregnating the porous structure fully. However, this procedure caused the impregnant to corrode the porous tungsten to a degree rendering it useless. Furthermore, it was found that the tungstate portion of the impregnant increased far beyond expectation. That is to say, the corrosion products, which are tungstate, effectively diluted the impregnant to an extent decreasing emission.

Accordingly, it is the principal object of the present invention to provide a method facilitating the complete impregnation of a porous tungsten body, without the use of diluents or foreign carriers.

More specifically, it is an object of the invention to produce complete impregnation of a porous tungsten piece by increasing the fluidity of the molten emissive mixture, without giving rise to adverse effects. A significant feature of the invention is that it permits the introduction of pure alkaline earth compounds, whereby the limit of a 10/1 mol ratio of barium oxide to the selected tungstate called for in said co-pending application, can now be effectively extended to infinity.

Briefly stated, these objects are accomplished by forming a blank of porous tungsten using powder metallurgical techniques, and filling the pores of the blank with molten alkaline earth metal oxide which is heated to a temperature rendering the metal oxide relatively fluid, the impregnation of the pores being carried out in the presence of barium vapor to prevent corrosion of the tungsten.

For a better understanding of the invention, as well as other objects and further features thereof, reference is made to the following detailed description to be read in connection with the accompanying drawing, wherein:

FIG. 1 is a flow chart of the method of fabricating a cathode structure in accordance with the invention; and FIG. 2 is a sectional view of said cathode structure.

Fabrication of tungsten body

Each step in the method will be represented in a block in FIG. 1 of the drawing. Initially, in making a cathode in accordance with the invention, a porous tungsten bar or tube is formed by conventional metallurgical methods. Tungsten powder is pressed at 20,000 pounds per square inch pressure into a bar-shaped body 10. The body is then sintered at 11 in the manner disclosed, for example, in Levi Patent 2,669,008, but at a substantially lower temperature.

Instead of a copper filler, a plastic is used at step 12 to impregnate the porous tungsten bar so as to facilitate machining, the plastic preferably being methyl methacrylate which is capable of polymerization and depolymerization without leaving foreign deposits. A more detailed description of suitable plastic fillers for this purpose and of the methods of introducing and removing such fillers, may be found in my United States Patent No. 3,076,916.

Once the sintered tungsten body at step 13 has been machined to the desired dimensions, the plastic may be removed at 14 by heating at a relatively low temperature, as for example, 1000° C. for five minutes in a vacuum furnace.

*Impregnation of tungsten body*

The porous tungsten body is impregnated with a fused mixture of an alkaline earth metal oxide and a tungstate of an alkaline earth metal, the alkaline earth metal oxide forming a substantial portion of the mixture. Specifically, the mixture is constituted by barium oxide and at least one tungstate selected from the class of barium tungstate, strontium tungstate and calcium tungstate. The impregnant mixture may also be composed of barium oxide and a mixture of all of the tungstates above listed.

The impregnant mixture is preferably prepared in a semi-fused state to insure complete mixing and solution of the two compounds. One can start with either barium hydroxide or barium carbonate, the former being preferable. Strontium tungstate is the preferred alkaline tungstate. The correct amount of the two compounds according to the mol ratio of 5/1 is weighed out at 15 and mechanically mixed.

The entire amount of powder is placed in a tungsten boat at 16 and heated in a hydrogen furnace at a temperature of about 1000° C. until the fused mixture starts to boil and the impregnant is then allowed to cool in hydrogen to room temperature. A small portion of the mixture in the semi-fused state is removed and ground to powder at 17 in a mortar, and a sufficient amount of powder is made to cover completely the tungsten parts that are to be impregnated.

The porous tungsten parts to be impregnated are placed in a tungsten boat or on a tungsten sheet at 18, and after being covered with the impregnant powder, the parts are slowly heated in a furnace to a temperature of about 1850° C., at which level the impregnant is fluid, the heating being carried out in an atmosphere containing an auxiliary source of barium vapor. An impregnation period of 15 to 30 seconds at this temperature is generally ample to fill completely the pores of the tungsten. The parts are allowed to cool to room temperature, are cleaned of excess impregnant, and are then assembled at 19 into a cathode structure.

A typical cathode structure, as shown in FIG. 2, comprises a sintered tungsten tube 20 impregnated with a mixture of strontium tungstate and barium oxide, the tube being closed at the ends by molybdenum caps 21. A heater filament 22 is coaxially extended through the lead-in wire for the filament passing through the caps. To prevent evaporation of material internally of the tube, the internal surface thereof may be lapped prior to impregnation to close the pores of its internal wall. It is to be understood that many other cathode forms may be used making use of the invention.

As pointed out previously, an impregnating temperature of 1850° C. rather than of 1750° C. as disclosed in the co-pending application, renders the molten oxide mixture more fluid but at the same time causes the impregnant to corrode the porous tungsten. This drawback is overcome, however, by carrying out impregnation in an atmosphere containing an auxiliary source of barium vapor.

The chemical equation, $4BaO + W \rightleftarrows 3Ba + BaWO_4$, is a reversible reaction. That is, the equilibrium can be driven from left to right or right to left, depending on the amount of barium present. In order to impregnate the porous tungsten piece completely, it is necessary to increase the fluidity of the molten mixture by an increase in temperature. Such increase in temperature causes the emissive mixture to react chemically with the porous tungsten, as indicated by the equation. In other words, the chemical reaction now written for one species of the emitting material goes from left to right.

But if an auxiliary source of barium is present, then the reaction can be made to remain static or to go from right to left, and a controlled composition of impregnant will enter the pores of the tungsten. In the table to follow, a comparison is given between the weight gain of a series of porous tungsten pellets impregnated in the presence of a barium vapor source and in the absence of such a source. In each case, the impregnant was a 5/1 mol ratio of barium oxide and barium tungstate. All porous tungsten pellets had a density of 82% ±½, and a weight of 98 milligrams ±0.5.

TABLE

| Weight Gain of Tungsten with Barium Source, mg. | Weight Gain of Tungsten without Barium Source, mg. |
|---|---|
| 5.5 | 3.3 |
| 5.0 | 3.6 |
| 5.2 | 5.5 |
| 5.2 | 4.5 |
| 5.2 | 5.0 |

From the consistency of the above results in the left-hand column, the advantages of impregnation with a barium vapor source will be evident. Similar comparisons have been made for other impregnant compositions, as for example, 8BaO–1BaWO$_4$, and 10BaO–1BaWO$_4$, etc., with results substantially the same as shown in the above table. The impregnation procedure in accordance with the invention makes it possible to introduce pure alkali earth compounds, whereby the 10/1 mol ratio limit previously imposed can now be extended to infinity.

There are various ways by which the auxiliary source of barium can be generated. In practice, pure barium metal may be placed in the cooler part of the furnace. Alternatively, one may use any compound of barium which when heated decomposes to metallic barium. Barium nitride is suitable for this purpose.

Also useable as a barium vapor source, are metallic vapors of strontium, calcium, lithium, magnesium, etc., which when heated with barium oxide form metallic barium as a reaction product. Normally at the high temperature of impregnation, some barium is generated via the following reaction:

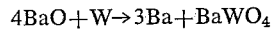

$$4BaO + W \rightarrow 3Ba + BaWO_4$$

Thus the impregnation is carried out under a vapor pressure of barium in the normal course of operation. Calculations show that the equilibrium pressure of barium over barium oxide and tungsten is about 0.2 mm. Hg at 1700° C., 0.8 mm. Hg at 1800° C., and 2.0 mm. Hg at 1900° C. Therefore, any auxiliary source of barium introduced at the time of impregnation must produce a vapor pressure exceeding the values normally present. In practice, the auxiliary source of barium is allowed to actually boil during the step of impregnation. The boiling barium metal within the impregnation chamber of the furnace assures a barium pressure over the molten impregnant far in excess of the minimum required to avoid corrosion of the porous tungsten.

It will be obvious that many changes may be made in the method of the invention, without departing from the essential spirit of the invention as defined in the annexed claims.

What is claimed is:

1. A method of fabricating a dispenser cathode, comprising the steps of forming a porous body of sintered tungsten and impregnating the pores of said body with a molten mixture of barium oxide and at least one tungstate selected from the class consisting of barium tungstate, strontium tungstate and calcium tungstate, said impregnation being carried out at a temperature above 1750° C. at which the impregnant normally tends to corrode the tungsten body and in the presence of barium vapor derived in part from an auxiliary source to produce a vapor pressure exceeding the values normally present and in excess of the minimum value required to inhibit said corrosion.

2. A method of fabricating a dispenser cathode, comprising the steps of forming a porous body of sintered tungsten and impregnating the pores of said body with a mixture of barium oxide and at least one tungstate selected from the class consisting of barium tungstate, strontium tungstate and calcium tungstate, the mol ratio of barium oxide to the selected tungstate being at least 10 to 1, said impregnation being carried out at a temperature above 1750° C. at which the impregnant normally tends to corrode the tungsten body and in the presence of barium vapor derived in part from an auxiliary source to produce a vapor pressure exceeding the values normally present and in excess of the minimum value required to inhibit said corrosion.

3. The method of impregnating a porous tungsten body to form an emissive cathode, comprising the steps of mixing barium oxide particles with tungstate particles selected from the class consisting of barium tungstate, strontium tungstate and calcium tungstate, heating and cooling the mixed particles to form a fused mixture, grinding the fused mixture into a powder, covering the tungsten body with the powder and heating the covered body in a furnace at a temperature above 1750° C. at which the impregnant normally tends to corrode the tungsten body and in the presence of barium vapor to melt the powder and to cause complete impregnation of said body, said barium vapor being derived in part from an auxiliary source to produce a vapor pressure exceeding the value normally present and in excess of the minimum value required to inhibit said corrosion.

4. The method as set forth in claim 3, wherein said powder is heated to a temperature of about 1850° C.

5. The method as set forth in claim 3, wherein said barium vapor is generated by heating pure barium metal in said furnace to the boiling point.

6. The method as set forth in claim 3, wherein said barium vapor is generated by heating barium nitride in said furnace.

References Cited by the Examiner
UNITED STATES PATENTS

| | | | |
|---|---|---|---|
| 944,139 | 12/1909 | Jones | 117—22 |
| 1,993,187 | 3/1935 | Spanner et al. | 117—224 X |
| 2,700,118 | 1/1955 | Hughes et al. | 117—224 X |
| 3,118,080 | 1/1964 | Koppius | 117—223 X |

ALFRED L. LEAVITT, *Primary Examiner.*

J. R. BATTEN, JR., *Assistant Examiner.*